Figure 1:
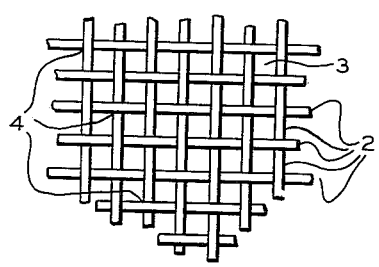

Sept. 18, 1962   F. C. USHER   3,054,406
SURGICAL MESH
Filed Oct. 17, 1958

INVENTOR.
F.C. USHER
BY
*Hudson and Young*
ATTORNEYS

United States Patent Office 3,054,406
Patented Sept. 18, 1962

3,054,406
SURGICAL MESH
Francis C. Usher, Houston, Tex., assignor to Phillips Petroleum Company, a corporation of Delaware
Filed Oct. 17, 1958, Ser. No. 767,937
10 Claims. (Cl. 128—334)

This invention relates to an improved mesh for surgical use. In one aspect it relates to an improved material for surgical repair and restoration of living tissue. In another aspect it relates to means for effecting such repair and restoration without certain defects and disadvantages inherent in materials utilized in prior practice. In still another aspect, this invention relates to an improved surgical mesh for the repair of tissue defects of the abdominal wall, chest wall, diaphragm and other weaknesses of the musculo-aponeurotic tissues of the body.

Prior to this invention it was known to repair severed living tissue by the use of a mesh cut to the desired size and shape. Such mesh was attached to the tissues on both sides of the wound by sutures and the tissues were drawn together in such a positional relationship that healing ensued. During the healing process, the healing tissue grows through the openings in the mesh, which consequently becomes imbedded in the tissue and strengthens it. Such mesh made of polyethylene has been used to advantage on account of the inertness of polyethylene toward living tissue. However, the polyethylene which has been used in the prior art is of the so-called "high-pressure" or "low-density" type. This material has certain serious disadvantages. For example, it tensile strength is low, necessitating the fabrication of the mesh by molding in integral form, an expensive procedure. Furthermore, it is subject to severe "creep", i.e. it gradually elongates and deforms when subjected to prolonged tension. This elongation or deformation is permanent and therefore an obvious disadvantage in surgical applications. In addition, low-density polyethylene cannot be heat sterilized under the usual hospital sterilization conditions without damage. This type of sterilization is preferred over other methods because it is convenient and readily applicable to the sterilization of large numbers of articles simultaneously and the subsequent maintenance of the sterilized articles in sterile condition for extended periods of time.

An object of this invention is to provide a surgical mesh of improved applicability to the repair and restoration of living animal tissue, especially human tissue. Another object is to provide a surgical mesh having increased strength. A further object is to provide a surgical mesh of improved flexibility and adaptability to muscular movement during convalescence and consequently of increased comfort to the patient. An additional object is to provide a surgical mesh which is compatible with and nonirritating toward living animal tissue. An additional object is to provide a nonmetallic surgical mesh which can be steam-sterilized without damage. Other objects and advantages will be apparent to those skilled in the art upon consideration of this disclosure.

Several embodiments of my invention are illustrated in the accompanying drawing.

Figure 2:
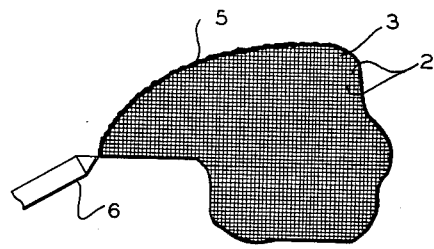
Figure 3:
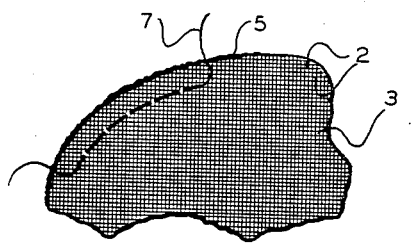
Figure 3A:
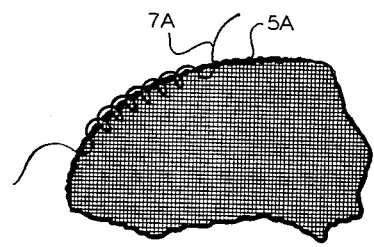
Figure 4:
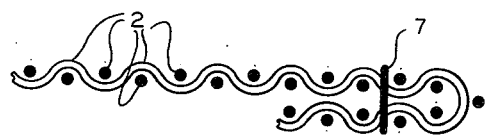

FIGURE 1 illustrates one embodiment of my invention.
FIGURE 2 illustrates a modification of my invention.
FIGURE 3 illustrates a further modification of my invention and particularly illustrates the use of sutures in connection therewith.
FIGURE 3a illustrates a modification of the embodiment illustrated in FIGURE 3.
FIGURE 4 illustrates a further modification of my invention and particularly a modified use of sutures therewith.

According to this invention, there is provided a woven surgical mesh made of polyethylene thread or yarn having a tensile strength in the range 50,000 to 150,000 p.s.i. The polyethylene must be free of water-leachable irritant impurities such as antioxidants and catalyst residues in order to prevent irritation and inflammation of animal tissue. The polyethylene mesh of my invention is inert and nonirritating even in the presence of infection.

An advantage of woven mesh, the threads of which are not mechanically joined at their points of contact, is that this mesh is highly pliable and adaptable to the movements of the muscles and tissues to which it is attached, thus increasing the comfort of the patient.

The individual threads or yarn of which the mesh is made according to this invention can be monofilaments or multifilaments. The size of the individual threads is in the range 100 to 500 denier. An important advantage of my invention resides in the possibility of using relatively fine yarn or thread, with resulting flexibility of the mesh woven therefrom, and still obtaining the requisite tensile strength. Such was impossible when the low-density polyethylene of the prior art was used; therefore, the prior practice was to resort to a molded mesh to obtain the requisite strength at a sacrifice of pliancy and, consequently, of comfort to the patient.

The polyethylene mesh of this invention must have a weave which is sufficiently porous to allow abundant growth of tissue through the graft without sacrificing tensile strength and "body" which are so essential in this type of prosthesis. A mesh with a spacing between filaments of 5 to 50 mils can be employed. Usually a monofilament with a diameter of 1 to 20, preferably 1 to 10, mils is used to weave the mesh. When a relatively large spacing between threads is employed, it is usually preferred to use a relatively large diameter monofilament within the stated diameter range. A taffeta weave has been employed to give the mesh exceptional tensile strength and to prevent raveling. Depending on the particular application, other types and styles of weave can be employed. For 1- to 10-mil monofilaments, a thread count in the range 25 x 25 to 50 x 50 is often preferred. I have used a mesh with a thread count of 42 x 42 per inch made from a polyethylene monofilament 6 mils in diameter and have found this to be very satisfactory. An 8-mil monofilament has also been used to make a satisfactory mesh having a thread count of 33 x 33 per inch. Adjacent threads can be equidistantly or nonequidistantly spaced in the mesh.

The mesh made from this polyethylene has a sufficiently high softening point to withstand the standard sterilization by heating in an autoclave at a temperature of 245° F. (steam pressure of 15 p.s.i.g.) for 20 to 30 minutes or boiling in water for 30 minutes. In some instances, sterilization by chemical means is preferred. The mesh is non-wettable by water and is not damaged in any way by the sterilization, provided the temperature is maintained below that at which deformation of the polymer occurs. The mesh can be cut to the desired pattern after sterilization, or standard sizes and shapes can be prepared prior to sterilization. The edges of the mesh can be heat sealed by searing with a cautery or they can be turned under. In either case, sutures can be placed within ⅛ inch of the edge under considerable tension without pulling out. A skilled surgeon can device suitable sizes and shapes of the polyethylene fabric as well as suitable means of inserting and suturing this material. Teflon, one of the prior art materials which has been tested for this type of use, has been found to be unsatisfactory because it cannot be woven into a suitable monofilament mesh or fabric. The sutures can be made of the same type polyethylene as the mesh in accordance with this invention.

The polyethylene utilized to prepare the mesh of this invention is generally known in the art as a "high-density" or "low-pressure" polyethylene. It has the following characteristics in addition to those already mentioned:

Density—at least 0.940 gm./cc., preferably 0.950 to 0.980
Molecular weight—at least 30,000, preferably 40,000 to 80,000.

Methods of preparing such polyethylenes are now known in the art. A much preferred polyethylene for the purposes of this invention can be prepared as described in U.S. Patent 2,825,721 (1958). Preferably, the polyethylene is prepared by polymerization of ethylene in the presence of a catalyst comprising chromium oxide, in which part of the chromium is hexavalent, supported on porous silica-alumina gel, at a polymerization temperature from about 250 to about 320° F. and a pressure of about 400 to about 700 p.s.i., the catalyst being suspended in an inert hydrocarbon such as cyclohexane during the polymerization. Catalyst is removed from the reactor effluent by filtration or centrifugation, and the polyethylene is recovered from solution in the cyclohexane filtrate. A typical polyethylene produced in this manner, and used in the specific examples hereinafter, has approximately the following properties:

Density _____ gm./cc__ 0.960
Molecular weight _____ 40,000

Monofilaments can be produced from polyethylene of the type just described by melting the polyethylene, extruding to form a filament (melt spinning) and cold-drawing the filament to from about 5 to about 20 or more times its original length at a temperature in the range 100 to 250° F. If desired, the cold-drawn filament can be pre-shrunk by immersion in boiling water for several minutes.

The low-density polyethylenes utilized in the prior art have densities of 0.930 or lower and molecular weights of less than 25,000.

High-density polyethylenes used according to this invention have a mass (nonfilamentary) tensile strength of the order of 4000 to 5000 p.s.i. When extruded and cold drawn to form a monofilament (as hereinbefore described) having a diameter of the order of 5 to 10 mils, the resulting polyethylene, as a filament, has a tensile strength of the order of 90,000 p.s.i., presumably as a result of molecular orientation. An important advantage of my invention over the formerly used molded low-density polyethylene mesh now becomes apparent. Such a mesh, not having been cold-drawn, can have no more than its mass or nonfilamentary tensile strength, which is of the order of 2000 p.s.i. Even if the prior art polyethylene were used in the form of cold-drawn monofilaments the tensile strength would be no greater than about 30,000 p.s.i. Thus the enormous increase in strength on cold-drawing, exhibited by high-density polyethylene is utilized to advantage according to my invention. This property allows a surgeon to use safely a polyethylene mesh made of finer fibers than has heretofore been possible. Such mesh has increased pliancy as well as great strength and physiological inertness.

FIGURE 1 in the drawings illustrates one embodiment of my invention wherein threads 2 are woven in a taffeta pattern to provide openings 3. The threads cross each other at points 4 at which there is no mechanical attachment of the threads to each other.

FIGURE 2 illustrates a further embodiment of my invention. As shown in FIGURE 2, a mesh woven of threads 2 and having openings 3 is heat sealed along its edge to provide a heat seal or bead 5. The numeral 6 illustrates any desired type of heating instrument which will perform a fusion of the thread ends. An important advantage of heat sealing as illustrated in FIGURE 2 is to provide a strengthening of the edge against raveling or pulling out of sutures.

One method of suturing a heat-sealed mesh in accordance with my invention is illustrated in FIGURE 3. Here, a suture 7 is utilized to attach the mesh to tissue. It will be noted that, in this embodiment, the suture is passed more or less parallel to the heat seal 5. I have found that, once the edge has been heat sealed as illustrated in FIGURES 2 and 3, sutures can be attached within ⅛ inch of the heat-sealed edge and will hold securely without pulling out. This embodiment illustrates an important advantage of my invention which will become apparent to those skilled in the art when it is considered that most prostheses are sutured after being turned under at their edges.

FIGURE 3a illustrates an embodiment wherein a different suturing technique from that illustrated in FIGURE 3 is utilized. In this embodiment, a suture 7a is passed repeatedly around the heat seal or bead 5a. Each of the loops or spirals of the suture can pass through the tissue.

FIGURE 4 illustrates another manner of using my invention. In this method of use, the edges of the mesh are heat sealed as illustrated in FIGURE 2 and sutured to tissue on one side of the wound, either by continuous or interrupted sutures. The mesh is then drawn across the wound and folded under as illustrated in FIGURE 4 to the desired pattern and then suture 7 is passed through the folded edge as illustrated in FIGURE 4, to effect an attachment of the mesh to the tissue on the other side of the wound or incision.

An additional and important advantage of my invention is that the mesh is inert in the presence of infection and does not have to be removed should the surgical wound become infected. Granulation tissue will grow through the mesh and normal wound healing will take place.

Because of the soft, flexible nature of the mesh in accordance with this invention, the mesh can be used as a prosthesis within the abdomen or chest without injury to the viscera of the chest or abdominal cavity, e.g. lungs, intestines, liver, etc.

A further feature of the mesh according to my invention is that this mesh has the advantage over metallic meshes in that, once it has been implanted as a surgical prosthesis, it can be cut through in subsequent operations, and again resutured in a manner not unlike operating through normal tissues. This cannot be done in the case of metallic meshes.

Further, in accordance with this invention, a polyethylene mesh as previously described herein can be placed on the inner surface of the abdominal or chest wall as a reinforcement or to replace a tissue defect. In this method of operation, the mesh is attached to the inner aspect of the abdominal or chest wall by means of mattress sutures. To my knowledge, this method has never been feasible prior to the advent of the present invention.

In the following specific examples, a polyethylene mesh woven from 6-mil polyethylene monofilament having a tensile strength of about 90,000 p.s.i. was utilized. The polyethylene from which the monofilament was prepared had properties previously specified herein. The monofilament was prepared by melt-extruding the polyethylene through a 0.021-inch orifice at 575° F., quenching in a water bath at 65–70° F., cold-drawing the quenched filament by stretching it, in a steam bath at 212° F., to 10 times its original length, and winding the drawn monofilament onto a spool.

*Example I*

I have carried out a series of tests to investigate the use of the high-density polyethylene described above for surgical prosthesis. Initially the material was tested in the form of small particles or pellets to determine the tissue reaction. The method used by the U.S. Bureau of Mines (Public Health Report, 56:264, 1941, Miller et al.) was employed in these tests. The plastic in the form of small particles or pellets was implanted intra-peritoneally in dogs, and seven days later the animals were sacrificed and the intra-abdominal viscera examined grossly for adhesions and other evidence of inflammatory reaction. Microscopic studies were also made of the tissues for confirmation of the gross findings. Three dogs were used for each plastic tested. It was shown that polyethylene is well tolerated in tissues and precipitates considerably less foreign body reaction than does nylon, Orlon or Dacron tested under the same conditions.

*Example II*

After establishing that there was very little or no tissue reaction to this polyethylene and also that a mesh woven from a monofilament as described above, have favorable physical properties, an investigation was undertaken to determine its usefulness in repairing tissue defects in dogs. Defects in the abdominal wall, chest wall, and diaphragm were made by excising rectangular blocks of tissue and suturing the polyethylene mesh over the defect. The skin was closed over the implant, and the dogs were sacrificed at intervals up to six months. Also a comparison of polyethylene with Teflon was made in one series of tests. In another series, infection studies were made.

The above described tests were carried out using 26 adult dogs. The results can be summarized briefly as follows: Inspection of the grafts at autopsy and histological examination showed the mesh to be well infiltrated with pliable fibrous tissue. Examination of the polyethylene mesh after six months implantation showed no fragmentation and no decrease in tensile strength. Infection studies demonstrated that granulation tissue would grow through the mesh in the presence of purulent infection without slough of the graft or sinus formation.

The amount of fibrous tissue formed in the infected wounds was found to be essentially the same as that present in the clean wounds that healed by primary intention. The inertness of the polyethylene mesh in the presence of infection is one of the most important characteristics of this new plastic. It is comparable to tantalum mesh in this respect. Comparisons with Teflon fabric implanted as a control showed more uniform infiltration of the polyethylene mesh and better bondage of this latter material to surrounding tissues.

*Example III*

Because of the successful results obtained in the experimental work with dogs, the polyethylene mesh was used in human beings in the surgical repair of hernias and other defects of the abdominal and chest wall. For those patients operated on early in the series, an overlap or mattress type of repair was used, either side-to-side or transverse, depending upon the location of the hernia. As more experience was gained it was found that the mesh could be sutured under considerable tension without sutures "pulling out" of the mesh.

A later technique was developed in which the polyethylene mesh was attached to the iner side of the peritoneum by sutures extending through the peritoneum, muscle layers, and outer fascia covering the muscle. Situated on the inside of an open defect in this manner, the graft appeared to have greater mechanical advantage than if it had been placed over the defect.

Polyethylene mesh was also used to repair inguinal hernias; to bridge defects resulting from the excision of primary tumors of the ribs; and to repair defects caused by excision of tumors of the anterior abdominal wall.

Palpation of the wounds of these patients two to three months following operation revealed an intact and pliable abdominal wall. The edges of the graft were difficult to delineate from the surrounding fascia and there were no ridges from buckling or wrinkling of the graft. There have been no recurrences to date in any of these patients.

It is within the scope of my invention to use the described high-density polyethylene in the form of a woven or knitted mesh, or other suitable form to repair defects in various portions or organs of the human or animal body. The exact shape or form of the polyethylene which is required and the means of inserting, suturing, and the like can be determined readily by one skilled in this art.

The properties of the polyethylene and the polyethylene filament referred to in this disclosure and in the claims are defined and determined as follows:

*Density.*—Density is ordinarily determined on a sample of the mass polyethylene in nonfilamentary form. The sample is prepared by compression molding of the polyethylene at a temperature of 340° F. in a mold provided with a water jacket through which water can be circulated. The sample is maintained at about 340° F. until it is completely molten. It is then cooled from 340 to 200° F. at the rate of approximately 10 Fahrenheit degrees per minute. Water is then circulated through the mold to continue the cooling to 150° F., the rate not exceeding 20 Fahrenheit degrees per minute. The polyethylene is then removed from the mold and cooled to room temperature. A small piece of the solidified polyethylene is cut from the compression molded sample and inspected to make sure that it is free of voids and that it has a sufficiently smooth surface to prevent the trapping of air bubbles thereon. The small sample is placed in a 50-ml. glass-stoppered graduate. Carbon tetrachloride and methylcyclohexane are then allowed to run into the graduate from separate burettes in such proportions that the sample is suspended in the mixed solution, i.e. it neither floats nor sinks. The graduate is shaken during the addition of liquid in order that the two liquids mix thoroughly. A total liquid volume of 15 to 20 ml. is required. After the liquids have been so proportioned that the polyethylene is suspended therein without sinking or floating, the density of the liquid mixture is equal to the density of the solid polyethylene. The polyethylene is then removed from the liquid and a portion of the liquid mixture of carbon tetrachloride and methylcyclohexane is transferred to a Westphal balance and the specific gravity of the liquid is measured at a temperature in the range 73 to 78° F. This specific gravity is equal to the specific gravity of the polyethylene. For most practical purposes, the specific gravity can be considered identical to the density. However, if a precise conversion to actual density units (grams per cc.) is desired, this is readily preferable to water at 4° F. by calculations which will readily be evident to those skilled in the art. The precision of a single specific gravity determination is ordinarily within ±.0002.

*Molecular weight.*—The molecular weight determination is based upon a measurement of the intrinsic viscosity of the polyethylene. The intrinsic viscosity is determined by measuring the time required for a filtered solution of 0.1000 gram of the polyethylene in 50 ml. of tetralin (measured at room temperature, i.e., about 75° F.) to run through the marked length on a size 50 (0.8–3.0 centistokes) Ostwald-Fenske viscosimeter at a temperature of 130° C. (the viscosimeter being immersed in a thermostatically controlled oil bath) and measuring also the time required for an equal volume of tetralin containing no polyethylene to run through the same distance on the same viscosimeter. The molecular weight is calculated in accordance with the following formula:

$$M_w = \frac{K 2.303 \log V_r}{C}$$

where $K = 24,450$
$C = 0.183$
$V_r =$ time, in seconds, required for solution to run through viscosimeter divided by the corresponding time required for the polymer-free tetralin, both at 130° C.

A single determination of molecular weight ordinarily has a precision of ±1000 molecular weight units.

The tensile strength of the mass, nonfilamentary polyethylene is determined by ASTM Method D-412-51T (Die C), the specimen being drawn at a rate of 20 inches per minute. This method applies to compression molded samples and specimens.

The tensile strength of the filamentary polyethylene is determined by ASTM Method D-1380-55T modified in that a 4-inch gauge length of the filament or yarn is used and the sample is stretched at the rate of 12 inches per minute.

Although certain processes, structures and specific embodiments have been described for purposes of illustration, it will be clear to those skilled in the art that the invention is not limited thereto.

I claim:

1. A surgical mesh of polyethylene thread free of water-leachable irritant impurities and having a tensile strength of at least 50,000 p.s.i. and a weight from 100 to 500 denier, the threads within said mesh being spaced at intervals in the range 5 to 50 mils and being unattached to each other at their points of crossing, said mesh being physiologically inert even in the presence of infection.

2. A knitted mesh according to claim 1.

3. A steam-sterilizable surgical mesh woven from cold-drawn polyethylene thread having a tensile strength in the range 50,000 to 150,000 p.s.i. and a weight in the range 100 to 500 denier, the threads within said mesh being spaced at intervals in the range 5 to 50 mils and being unattached to each other at their points of crossing, the polyethylene having a density of at least 0.940 and a molecular weight in the range 40,000 to 80,000, and being free of water-leachable irritant impurities, and said mesh being physiologically inert even in the presence of infection.

4. A steam-sterilizable surgical mesh woven from cold-drawn polyethylene monofilament having a diameter in the range 1 to 10 mils and a tensile strength in the range 50,000 to 150,000 p.s.i., the thread count in said mesh being in the range 25 x 25 to 50 x 50 threads per inch, the threads within said mesh being unattached to each other at their points of crossing, the polyethylene having a density in the range 0.950 to 0.980 and a molecular weight in the range 40,000 to 80,000, and being free of water-leachable irritant impurities, and said mesh being physiologically inert even in the presence of infection.

5. A steam-sterilizable surgical mesh woven from cold-drawn polyethylene monofilament having a diameter in the range 1 to 10 mils and a tensile strength in the range 50,000 to 150,000 p.s.i., the edges of said mesh being heat-sealed to prevent raveling, the thread count in said mesh being in the range 25 x 25 to 50 x 50 threads per inch, the threads within said mesh being unattached to each other at their points of crossing, the polyethylene having a density in the range 0.950 to 0.980 and a molecular weight in the range 40,000 to 80,000, and being free of water-leachable irritant impurities, and said mesh being physiologically inert even in the presence of infection.

6. A method of repairing damaged living animal tissue which method comprises attaching to said tissue, adjacent the site of damage, a physiologically inert surgical mesh of polyethylene thread free of water-leachable irritant impurities, which mesh has openings which permit growth of tissue therethrough, the threads within said mesh being unattached to one another at their points of crossing and having, individually, a tensile strength in the range 50,000 to 150,000 p.s.i. and a weight in the range 100 to 500 denier, and causing said mesh to remain in place during the healing of said tissue.

7. A method according to claim 6 wherein the mesh is attached to said tissue by sutures passed through a doubled peripheral portion of said mesh.

8. A method according to claim 6 wherein the mesh is attached to the tissue by means of sutures passing through the mesh within the area bounded by the heat-sealed edge.

9. A method for repairing tissue defects in the human abdominal wall, chest wall and diaphragm which method comprises attaching a surgical mesh as described in claim 3 to the inner aspect of such wall and causing the healing of said defect.

10. A surgical mesh having openings permitting growth of animal tissue therethrough said mesh being made of monofilaments having a tensile strength of at least 50,000 p.s.i., being unattached to each other at their points of crossing, and prepared from a normally solid polymer of ethylene having a density in the range 0.940 to 0.980, and said mesh being physiologically inert even in the presence of infection.

References Cited in the file of this patent

UNITED STATES PATENTS

| | | |
|---|---|---|
| 2,671,444 | Pease | Mar. 9, 1954 |
| 2,882,263 | Natta et al. | Apr. 14, 1959 |

FOREIGN PATENTS

| | | |
|---|---|---|
| 538,782 | Belgium | Dec. 6, 1955 |

OTHER REFERENCES

Operative Surgery, Bickham, vol. IV, copyright 1924, pages 149–150 required. Copy in Div. 55.